Nov. 18, 1947.  W. H. MARSHALL  2,431,059
DRINKING GLASS
Filed June 5, 1939
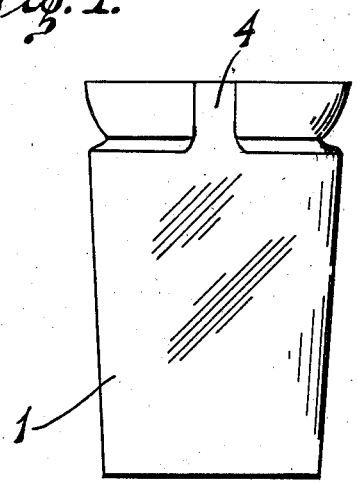
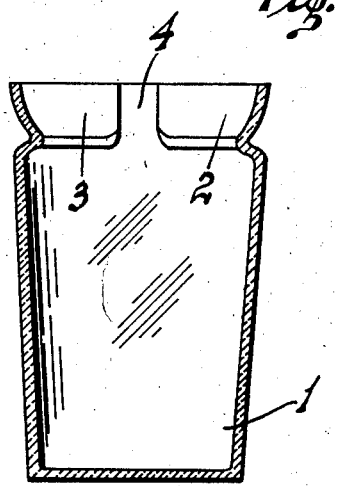
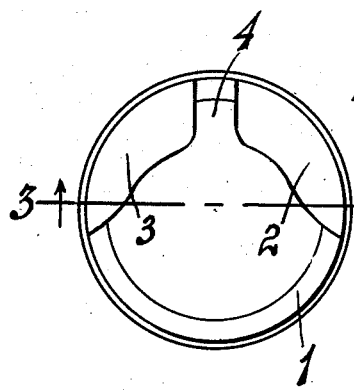
INVENTOR.
WILLIAM H. MARSHALL.
BY
ATTORNEY.

Patented Nov. 18, 1947

2,431,059

UNITED STATES PATENT OFFICE 2,431,059

DRINKING GLASS

William H. Marshall, Hermosa Beach, Calif.

Application June 5, 1939, Serial No. 277,518

Section 3, Public Law 690, August 8, 1946
Patent expires June 5, 1959

2 Claims. (Cl. 65—13)

This invention relates to a drinking glass and particularly those glasses in which iced drinks are served.

An object of my invention is to provide a novel drinking glass in which inwardly protruding elements are provided, integrally formed with the glass, serving to retard the movement of ice in the glass from moving into the mouth of the user.

Another object is to provide a novel drinking glass provided with inwardly protruding guard ledges, which are integrally formed with the glass, a suitable space being provided between the ledges through which the liquid in the glass can readily move.

A further object is to provide a novel drinking glass of the character stated, which is simple in construction, inexpensive to manufacture, and effective in use.

Other objects, advantages and features of invention may appear from the accompanying drawing, the subjoined detailed description, and the appended claims.

In the drawing:

Figure 1 is a side elevation of my drinking glass.

Figure 2 is a top plan view of the same.

Figure 3 is a vertical, sectional view taken on line 3—3 of Figure 2.

Referring more particularly to the drawing, the numeral 1 indicates a drinking glass formed of a moldable substance, such as glass, plastics, or the like. Adjacent the upper edge of the glass and spaced somewhat below this upper ledge, I provide a plurality of inwardly protruding ledges 2, 3. These ledges are preferably formed by pressing the wall of the glass inwardly while the material is plastic, or otherwise molding them while the glass is being formed. While I have shown two of these ledges, it is obvious that more may be incorporated in the glass, if desired. The ledges 2, 3 are spaced apart, as shown at 4, so that the liquid in the glass can freely flow into the mouth of the user. The space 4 is sufficiently narrow so that the larger particles of cracked ice in the drink will be prevented from flowing into the mouth. The larger cubes of ice are also held in the glass due to the fact that they will strike either or both of the ledges 2, 3 before flowing out of the glass with the liquid.

I prefer that the guard ledges 2 and 3 be formed by pressing the wall of the glass inwardly while the glass is in a semi-molten or plastic state. Other acceptable means of forming the ledges integral with the wall of the glass may be satisfactorily used.

The upper surface of each of the ledges tapers gradually to the upper edge of the glass 1, and the lower faces of the ledges are substantially abrupt or curved acutely into the wall of the glass so that the ice may be more effectively stopped. The edges of the ledges adjacent the opening or space 4 are preferably wider than the opposite edges thereof, due to the fact that ice will normally rest on the bottom of the glass and, therefore, the greatest quantity of ice will accumulate on each side of the space 4.

Having described my invention, I claim:

1. In a drinking glass, a pair of guard ledges spaced below the upper edge of the glass, said ledges being arcuate in form and the adjacent edges being spaced, said ledges forming part of the wall of the glass, said wall being pressed inwardly to form said ledges.

2. In a drinking glass, a pair of guard ledges spaced below the upper edge of the glass, said ledges being arcuate in form and the adjacent edges being spaced, said ledges forming part of the wall of the glass, said wall being pressed inwardly to form said ledges, said guard ledges being substantially parallel to the top edge of the glass.

WILLIAM H. MARSHALL.

REFERENCES CITED

The following references are of record in the file of this patent:

UNITED STATES PATENTS

| Number | Name | Date |
|---|---|---|
| 144,614 | Greenough | Nov. 18, 1873 |
| 207,910 | Smith | Sept. 10, 1878 |
| 213,455 | Schenck | Mar. 18, 1879 |
| 351,255 | Edgar | Oct. 19, 1886 |
| 619,363 | Stevenson | Feb. 14, 1899 |
| 2,069,089 | Goldman et al. | Jan. 26, 1937 |

FOREIGN PATENTS

| Number | Country | Date |
|---|---|---|
| 21,343 | Great Britain | Oct. 1, 1902 |
| 18,197 | Great Britain | Aug. 22, 1904 |
| 24,619 | Great Britain | Nov. 3, 1906 |
| 208,364 | Great Britain | Dec. 20, 1923 |